US011994828B2

(12) United States Patent
Zaugg

(10) Patent No.: US 11,994,828 B2
(45) Date of Patent: May 28, 2024

(54) MECHANICAL MOVEMENT WATCH WITH FORCE CONTROL MECHANISM

(71) Applicant: Montres Breguet S.A., L'Abbaye (CH)

(72) Inventor: Alain Zaugg, Le Sentier (CH)

(73) Assignee: Montres Breguet S.A., L'Abbaye (CH)

(*) Notice: Subject to any disclaimer, the term of this patent is extended or adjusted under 35 U.S.C. 154(b) by 511 days.

(21) Appl. No.: 17/370,118

(22) Filed: Jul. 8, 2021

(65) Prior Publication Data

US 2022/0107608 A1 Apr. 7, 2022

(30) Foreign Application Priority Data

Oct. 2, 2020 (EP) .................................... 20000355

(51) Int. Cl.
*G04B 15/14* (2006.01)
*G04B 13/02* (2006.01)
*G04B 17/28* (2006.01)

(52) U.S. Cl.
CPC ............. *G04B 15/14* (2013.01); *G04B 13/02* (2013.01); *G04B 17/285* (2013.01)

(58) Field of Classification Search
CPC ....... G04B 15/14; G04B 13/02; G04B 17/285
USPC ......................................................... 368/125
See application file for complete search history.

(56) References Cited

U.S. PATENT DOCUMENTS

2007/0127319 A1* 6/2007 Goeller .................. G04B 15/10 368/124
2013/0155820 A1* 6/2013 Rochat ................... G04B 17/28 368/128
2013/0194900 A1* 8/2013 Capt .................... G04B 17/285 74/1.5

FOREIGN PATENT DOCUMENTS

CH 330 892 A 6/1958
CH 702 179 A2 5/2011
WO WO-2011113757 A1 * 9/2011 ............... G04B 1/12
WO 2011/157797 A1 12/2011

OTHER PUBLICATIONS

European Search Report for EP 20 00 0355 dated Mar. 8, 2021.

* cited by examiner

*Primary Examiner* — Edwin A. Leon
*Assistant Examiner* — Kevin Andrew Johnston
(74) *Attorney, Agent, or Firm* — Sughrue Mion, PLLC

(57) ABSTRACT

A watch (1) with a mechanical movement with force control mechanism, and of the jumping seconds type. The mechanism is disposed in a finishing train of the mechanical movement between an energy source and an escape wheel set (11) linked to an oscillator (14) in oscillation to drive the escape wheel set in the same direction of rotation. The escape wheel set meshes with a seconds wheel (2). A rotary locking element (7) is arranged to cooperate with a stop member (3) mechanically linked to the accumulation seconds wheel to lock in a stop mode or release in a jump mode the finishing train according to the angular position of the seconds wheel. A stop member spring (4) rotates the accumulation fixed seconds wheel and the escapement mechanism linked to the oscillator at each half oscillation of the oscillator in stop mode.

14 Claims, 6 Drawing Sheets

MECHANICAL MOVEMENT WATCH WITH FORCE CONTROL MECHANISM

CROSS REFERENCE TO RELATED APPLICATION

This application claims priority to European Patent Application No. 20000355.6 filed Oct. 2, 2020, the entire contents of which are incorporated herein by reference.

FIELD OF THE INVENTION

The invention relates to a mechanical movement watch with force control mechanism, such as the force due to gravity when wearing the watch and of the jumping seconds type. Preferably, the force control mechanism may be a tourbillon mechanism mounted at the escapement. The cage of the tourbillon surrounds the escapement mechanism and preferably the cage performs a complete rotation every minute with particularly 60-second jumps performed.

BACKGROUND OF THE INVENTION

As a reminder in horology, a tourbillon, also known as "rotary cage", is a horological complication, added to the escapement mechanism, intended to improve the precision of mechanical watches by counterbalancing the disturbances of the isochronism of the resonator due to the earth's gravity. The fundamental criterion, which identifies a tourbillon, particularly in relation to a karussel, is the presence of a fixed train on which the cage of the tourbillon meshes. Generally, the cage of the tourbillon is rotatably mounted between two fastening points.

Gravity is also taken into account in order to compensate all of the disturbances of the isochronism of the resonator. The escapement is coupled to the resonator. It interacts with it once or twice per period of oscillation. The angle travelled by the resonator during the interaction is known as lift angle. The rest of the travel of the resonator is known as supplementary angle or arc.

During the supplementary angle, the resonator may be in contact with the escapement (frictional rest escapement) or without contact (free escapement). During the lift angle, the escapement executes two main phases, which are the unlocking (or counting) and the impulse (or maintenance).

In a horological complication, the aim of the jumping seconds is to display the seconds by pitch of a whole second, which corresponds on a 60-second dial to 6° of angle per second. This jumping seconds is often associated with constant force mechanisms that take advantage of the specific construction feature of this jumping seconds. Fixed seconds or independent seconds mechanisms are also similar to these constructions with the specific feature of being able to stop the seconds at will like a chronograph.

A plurality of jumping seconds mechanisms exist in horology literature and patents, and are applied. According to some examples, in a Jacquet Droz watch, there is the Blancpain 1195 movement. For the Breguet Marie Antoinette, there is the mechanism with the independent seconds.

In patent application WO 2011/157797 A1, a mechanism for advancing by periodic jumps of a pivoting cage supporting a wheel and an escape pinion and a pallet cooperating with the wheel and a sprung balance is described. In addition, it comprises retaining means to enable or prevent the pivoting of said cage according to the movements or not. There are also stopping means to enable or prevent according to their angular position the pivoting of the retaining means. A constant force device periodically makes the retaining means cooperate. This device includes a flirt provided in order to perform complete revolutions.

The principle of these mechanisms described is to retain the finishing train between the escapement and the seconds by a mechanism, whereas a subsidiary spring maintains the escapement with a constant force in a stop phase. At the end of the second, which is counted by the escapement, the released train makes it possible to perform the advance of one second. Thus, the display therefore advances and the mechanism is rewound in jump phase.

In such a mechanism functioning at frequencies close to the second, the torques available in horology are very low. This is why these mechanisms are difficult to produce and in general not very reliable.

In the mechanism of the Blancpain 1195 movement, there is a stopping system that distributes a portion of torque in the locking of the stop phase to compensate the frictions. This gives a jumping seconds having an angular displacement of approximately 20% in the stop phase for a jump of 80%.

It may also be envisaged to reduce the frequency and to perform independent minutes instead of seconds, which facilitates the construction.

Some of these mechanisms may desynchronise after a complete unwinding, and switch to a locking position. This requires a stopping system linked to a power reserve mechanism, which will stop the mechanism before complete unwinding.

In a mechanism described in patent EP 1 528 443 B1, a constant force device for a watch, with independent seconds is proposed. This device makes it possible to move an arbor of a wheel set on a lever controlled by an energy storage spring, which tends to make the lever pivot. The device comprises a pinion of a first seconds wheel of the movement, which meshes with a setting-wheel mounted pivoting on this lever, and which meshes with the pinion of a second seconds wheel defining the wheel set. The lever supporting a finger must adapt in order to cooperate with a ratchet toothing of a stop wheel, which meshes with the first seconds wheel. When the finger is engaged with a radial flank of the ratchet, the train is locked particularly consisting of the first seconds wheel and of the setting-wheel without transmission of force of the first seconds wheel and the setting-wheel. The second seconds wheel is controlled by the escapement and only rotates when this is moved by the balance. The winding of the spring is ensured by the displacement of the lever in the opposite direction, for which the spring exerts on the lever a torque lower than that exerted by the barrel spring on the lever, when the stop wheel is released. Thus, the device makes it possible to adapt the winding/unwinding cycle depending on the number of teeth of the stop wheel. This device makes it possible to ensure a jumping seconds function, but the main drawback is that it is not easy to produce with a significant number of components needed to perform this operation. In addition, there is a displacement of a wheel set at the moment of the jumping seconds, which is not desired.

Patent CH 702 179 B1 describes an independent seconds system for a timepiece. It comprises an independent seconds wheel set with a first arm rotating about a first arbor thanks to a spring mounted coaxially on the first arbor, and a pin to wind the spring. It also comprises a seconds wheel set rotating about a second arbor to lock and unlock the first arm in order to cause a jump of the first arm linked to an independent seconds indicator. A medium wheel is also provided to rotate about a third arbor in order to lock or unlock the pin. In the locking state, this makes it possible to wind the spring, whereas in the unlocking state, this makes it possible to rotate the arm so long as it is not locked by the seconds wheel set.

Patent CH 330 892 A describes a jumping seconds timepiece for performing one jump per second. It is provided a driving wheel integral with the seconds arbor and a lever subjected to the action of a spring with a pinion at its free end and a gathering-pallet. The pinion meshes with the driving wheel and the jumping seconds driven wheel. As soon as the gathering-pallet is no longer engaged with the toothing of the driven wheel a jump of one second is performed by the action of the spring and of the lever coming back into initial position.

SUMMARY OF THE INVENTION

For the present invention, it is sought to produce a display of jumping seconds and also of constant force more simply, without wheel set displacement and without risk of desynchronisation at the end of winding and thus limiting the frictions for a use particularly in a tourbillon movement.

Therefore, the aim of the invention is to overcome the drawbacks of the prior art by supplying a mechanical movement watch with compensation or force control mechanism of the jumping seconds type overcoming the drawbacks of the devices of the above-mentioned prior art.

To this end, the invention relates to a mechanical movement watch with compensation or force control mechanism of the jumping seconds type, which comprises the features defined in independent claim 1.

Particular embodiments of the mechanical movement watch with compensation or force control mechanism of the jumping seconds type are also described in dependent claims 2 to 14.

One advantage of the mechanical movement watch with force control mechanism according to the invention resides in the fact that it comprises an energy accumulation fixed seconds necessary for maintaining a plurality of oscillations of the escapement mechanism with the oscillator, particularly in a stop mode before changing into a jump mode. Depending on the frequency of the resonator equipped with a traditional escapement, the accumulation fixed seconds maintains a few oscillations of the resonator or oscillator without a portion of the train coming from the barrel being driven. Preferably, the accumulation fixed seconds releases a locking element, such as a flirt after a certain number of oscillations particularly in order to move the cage of the tourbillon 6° clockwise (CW) and the finishing train coming from the barrel defining one second of the jumping seconds type. In the case of the tourbillon according to one example of embodiment with at least the fifth impulse of the oscillator of 2.5 Hz, the flirt is released and by it, the intermediate wheel linked to the flirt, the medium wheel, the medium large wheel and the barrel for driving the cage of the tourbillon by a pitch of 6° in a direction opposite to the accumulation of the fixed seconds. Primarily, the cage of the tourbillon may be angularly displaced after a certain number of oscillations defining one second. Through this arrangement without wheel set displacement, the risk of desynchronisation at the end of the winding is not affected.

Advantageously, the accumulation fixed seconds wheel defined AFSW is intended to move in stop phase by a certain number of small pitches following the oscillations of the spiral spring of the oscillator linked to the escapement mechanism, which is of the Swiss lever type.

BRIEF DESCRIPTION OF THE DRAWINGS

The aims, advantages and features of the mechanical movement watch with compensation or force control mechanism will become more apparent in the following description particularly with regards to the drawings wherein.

DETAILED DESCRIPTION OF THE INVENTION

In the following description, various members or elements of the watch mechanical movement with force control mechanism and of the jumping seconds type, which are well known in this technical field, will only be briefly described.

First of all, it should be noted that the mechanical movement watch with force control mechanism and of the jumping seconds type may be with a tourbillon the cage of which encloses an oscillator and a escapement mechanism as explained hereafter, or according to a traditional mechanical movement without tourbillon, which will be explained subsequently with reference to FIG. 5.

Figure 1:
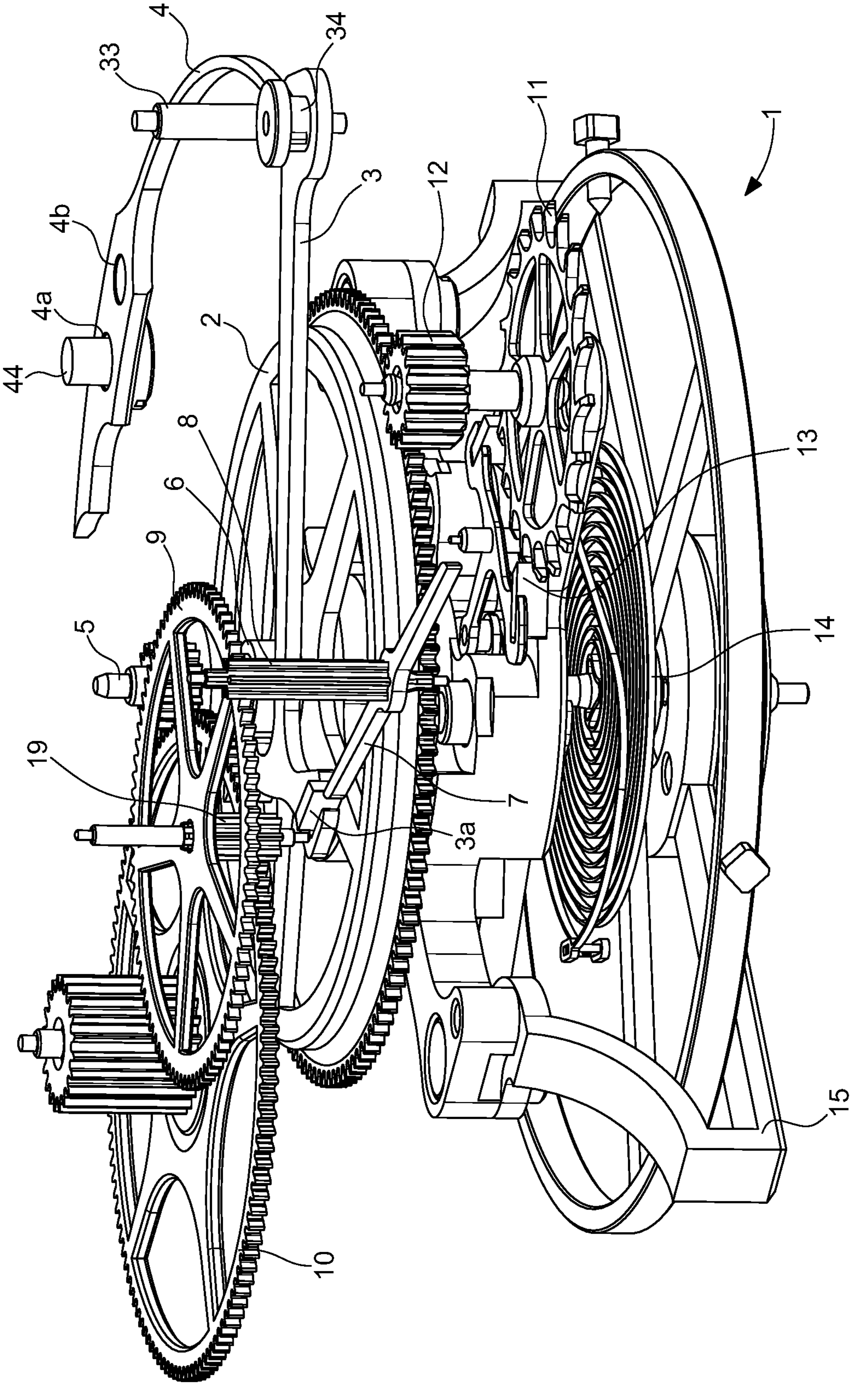
FIG. 1 represents a three-dimensional view from the bottom of the main elements of the watch movement with force control mechanism and of the jumping seconds type according to the invention.
Figure 2:
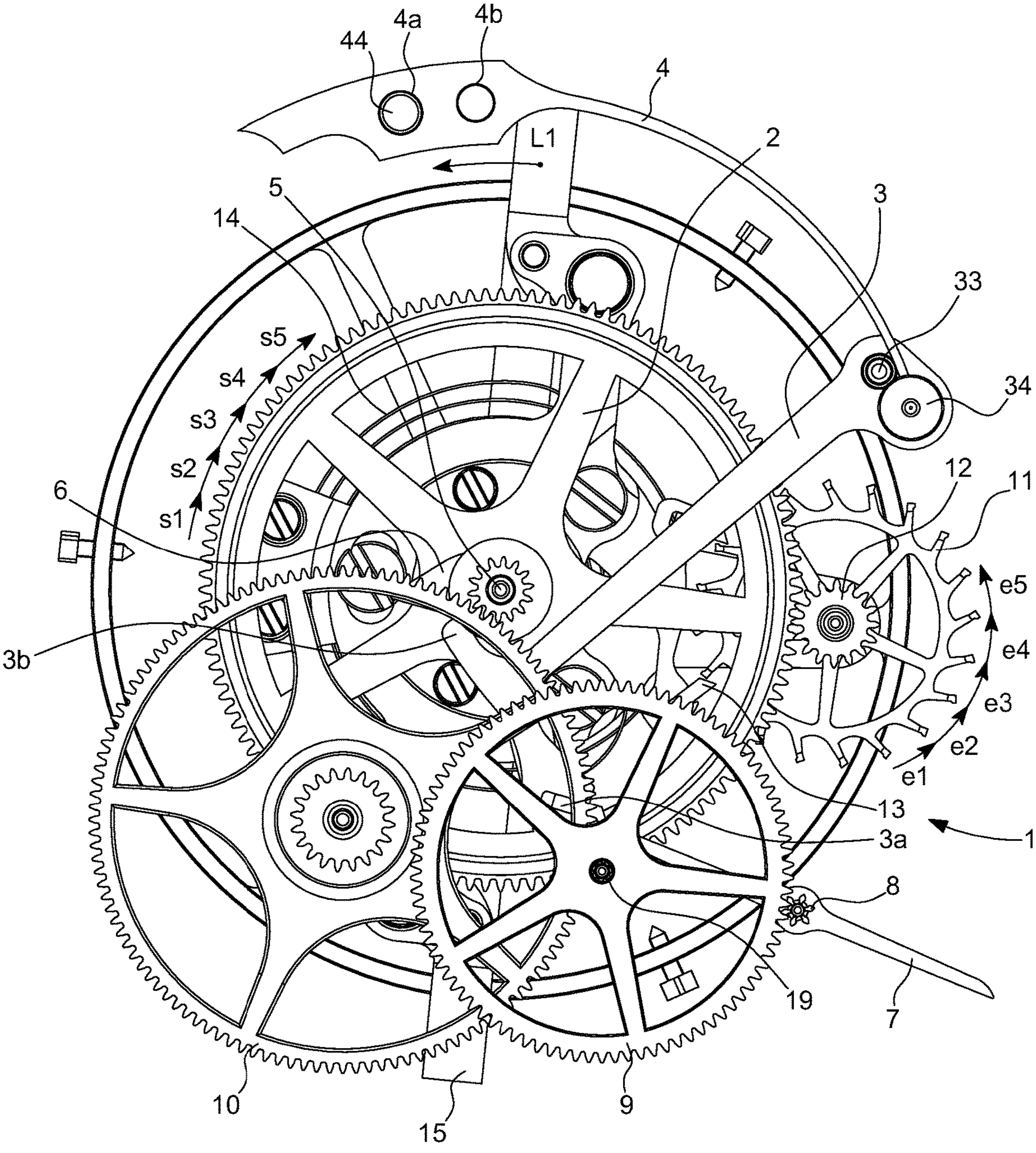
FIG. 2 represents a bottom view of the main elements of the force control mechanical movement watch of the jumping seconds type according to the invention, and showing the various movements of the escape wheel set and of the accumulation seconds wheel in stop phase and in jump phase of the tourbillon cage.
Figure 3:
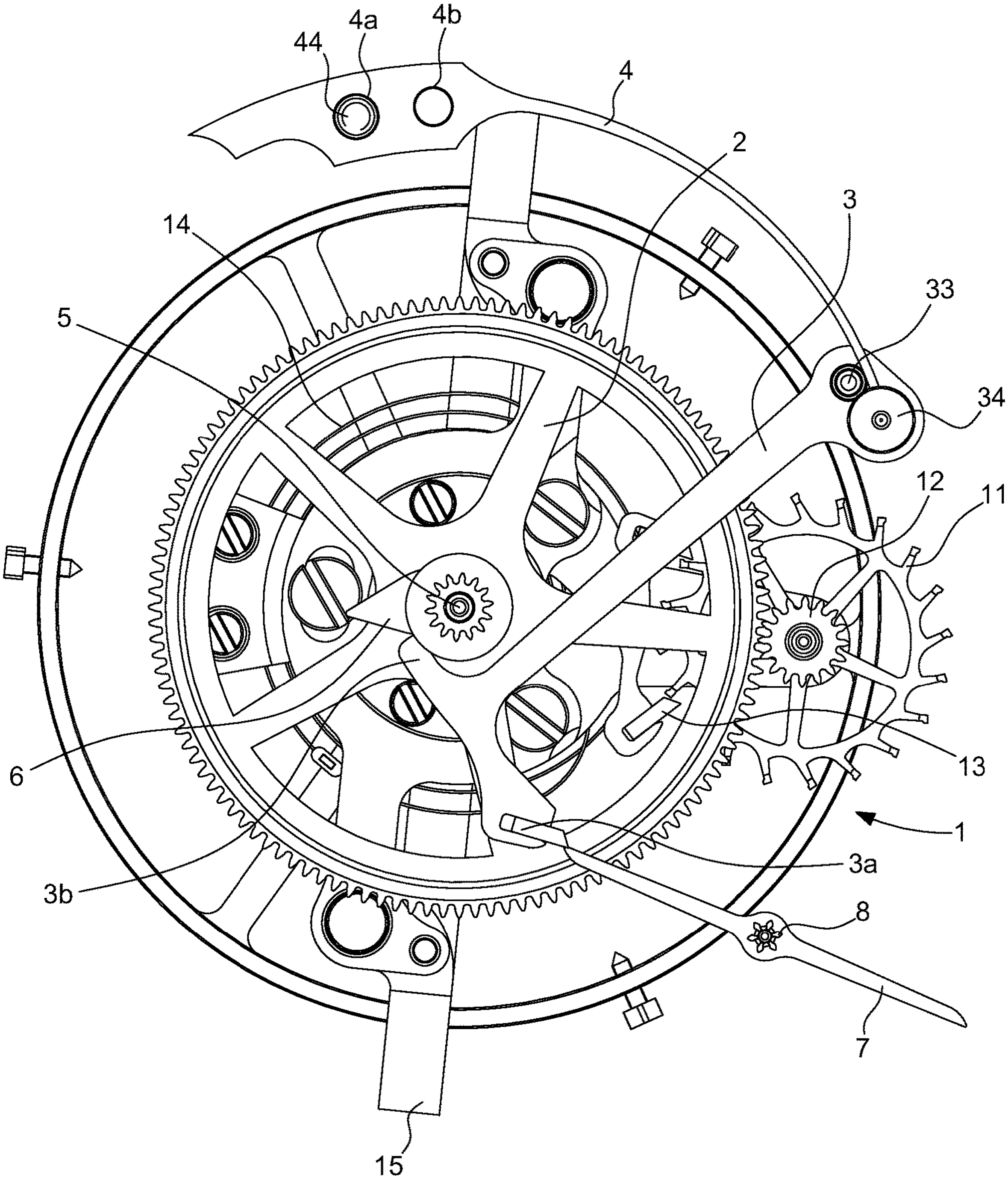
FIG. 3 represents a bottom view of the force control mechanical watch movement of the jumping seconds type according to the invention as represented in FIG. 2, but without the medium wheel and the intermediate wheel.

FIGS. 1 to 3 represent a portion of a watch mechanical movement 1 that is represented without the energy source, such as the barrel that is the motor spring and that is connected, in this scenario, to a fusee connected by chains to the barrel spring for its driving. It is also not represented a medium large wheel, which is rotated by a peripheral toothing of the fusee as explained hereafter with reference to FIG. 4. This energy is applied in the form of a torque on the pinion of the medium wheel 10.

FIGS. 1 to 3 therefore represent a portion of a horological mechanical movement comprising a finishing train 5, 8, 9, 10 wherein is disposed a force control mechanism of the watch mechanical movement 1. This force control mechanism may be similar to a constant force device. The finishing train is arranged between an energy source not represented, which is preferably a spring barrel, and for example a Swiss lever escapement mechanism 13 and having an escape wheel set 11 in the form of a wheel, retained and released alternately by an oscillator 14, which is preferably a sprung balance and of which the energy for its maintenance in oscillation is supplied by said escape wheel set. The escape wheel set 11 is arranged to be able to rotate in the same direction of rotation at each half oscillation of the oscillator 14.

The escape wheel set 11 meshes with a seconds wheel 2 that is defined subsequently as an accumulation seconds wheel AFSW. This seconds wheel 2 is known as a fixed seconds wheel AFSW, even if it is not fixed in its function. This fixed seconds wheel 2 may rotate anticlockwise (ACW) in order to maintain the function of the escapement mechanism linked to the oscillator in a stop mode, and rotate clockwise (CW) in a jump mode in order to perform a jump corresponding to 1 second. Also in the embodiment with a tourbillon, as in the embodiment without tourbillon, there is always a stop phase and a jump phase so as to carry out a jump on the display corresponding to one second.

For this, the accumulation fixed seconds wheel 2 AFSW preferably includes a peripheral toothing meshing with an escapement toothed pinion 12 coaxial to said escape wheel set 11. As explained hereafter in a stop phase of the finishing train, the accumulation fixed seconds wheel 2 rotates anticlockwise (ACW) and drives the escape wheel set 11 at each half oscillation of the oscillator 14 by means of the escapement toothed pinion 12 so as to maintain the function of the oscillator and of the escapement mechanism in this stop phase.

During this stop phase, the accumulation fixed seconds wheel AFSW 2 pivots ACW about the cage 15 of the tourbillon, which is stopped in the manner of a chronograph seconds pinion, like the chronographs of the Blancpain type, that is to say that the arbor of the cage 15 of the tourbillon, which comprises the seconds pinion 5, is with two pivoting noses as described subsequently in FIG. 6. The arbor may have a diameter equal to 0.35 mm. This ACW pivoting of the AFSW 2 performs up to the moment of the release of the finishing train 5, 8, 9, 10 by which a jump of one second is performed by the tourbillon cage 15 and its seconds pinion 5, driving with it the accumulation seconds wheel 2, which is linked to the escape wheel set 11, in the jump phase clockwise CW.

In order to define the stop phase and the jump phase, the force control mechanism comprises on the one hand preferably a rotary locking element 7 arranged to cooperate with a stop member 3 in connection with the accumulation seconds wheel 2 in the stop mode. As illustrated in FIGS. 1 and 2, or even also in FIG. 3, this stop member 3 is a rack 3, rotatably mounted about an arbor 33 at a first end of the rack 3, whereas at a second free end of the rack 3, it comes into contact for example with a cam 6 or guide portion integral with said seconds wheel AFSW 2. A rack 3 spring 4 is also provided to push or pull said rack 3 towards the cam 6. This AFSW spring 4 is mounted on the plate by a fastening rod 44 passing through a hole 4*a* or a hole 4*b* at a first end in the form of a plate of the spring 4 according to the desired position of the spring. The metal spring is composed from the fastening plate of a spring blade. A second end of the spring 4 is fastened to an eccentric part 34 disposed at the first end of the rack 3 and next to the arbor 33 of the first end of the rack 3, which makes it possible to adjust the force of the spring. Thus in this embodiment, the spring 4 of the rack 3 pushes by the eccentric part 34 said rack 3 towards the guide cam 6, which may have the shape of a tooth as represented. With the force of this spring 4, the accumulation seconds wheel AFSW 2 is rotated or pivoted by one small pitch corresponding to each half oscillation of the oscillator 14. The rotation of the accumulation seconds wheel 2 also drives the escape wheel set 11 by means of a coaxial escape pinion 12 of the escape wheel set of the Swiss lever escapement mechanism 13. This is advantageous for maintaining in function the escapement mechanism with the oscillator 14 in this stop phase by the force of the AFSW spring acting on the rack 3 in order to make the accumulation seconds wheel rotate 2 anticlockwise (ACW).

The rack 3 with its spring 4 acting on the accumulation seconds wheel 2 makes it possible to lock or release said finishing train according to the angular position of said seconds wheel 2 by the retention of a flirt 7, as locking element. This flirt 7 comes into contact with a stop part 3*a* of the locking portion of the rack 3. This stop part is a pallet-stone 3*a*, which may be made of a material reducing the friction such as ruby.

In the scenario presented, the accumulation fixed seconds wheel 2 may rotate by 5 small pitches s1 to s5 corresponding to 6° of angle representing 1 second in the opposite direction. The flirt 7 is itself driven by the finishing train and retained by the stop part 3*a*. Once released at the end of the stop phase, the rotation of the rack 3 releases the flirt 7 that triggers the jump phase. During the jump phase, the flirt 7 performs a rotation corresponding to a jump of 1 second, driven by the finishing train, in the case represented, a half revolution. The finishing train likewise drives the tourbillon cage 15 by the seconds pinion 5 and the accumulation fixed seconds wheel 2 AFSW clockwise (CW), which rewinds the spring 4. This accumulation seconds wheel 2 spring 4 is arranged to accumulate energy when said seconds wheel 2 is driven CW during the jump phase and returns it to said seconds wheel 2 ACW during the stop phase.

Generally, in the stop phase, a plurality of half oscillations of the oscillator 14 occur before the release of the finishing train. This means that the frequency of the oscillator 14 is generally higher than 1 Hz and for example in this present case, may be established at 2.5 Hz. As the fixed seconds wheel 2 rotates in the stop phase at each small pitch corresponding to a half oscillation (alternation), 5 half oscillations of the oscillator 14 may be counted in the stop phase up to the moment of the release of the rotary locking element 7 for the jump phase. The seconds wheel 2 spring 4 must therefore supply the energy during the 5 half oscillations of the oscillator 14 or the cage is stopped, and be rewound during the jump of said cage 15.

However, it may be provided more or less half oscillations of the oscillator 14 in the stop phase depending on the oscillation frequency of the oscillator 14. Each half oscillation must be equal to 0.5 Hz. The number n of half oscillations of the oscillator may therefore be selected for a frequency of the oscillator greater than 1 Hz, for example for at least n=3 half oscillations. The number of small pitches performed by the fixed seconds wheel 2 in stop phase must correspond to a jump of 1 second in jump phase.

It may also be envisaged to carry out period jumps greater than 1 second, which generalises the rule above at an oscillator frequency greater than the frequency of the display jumps. In this way, it may be envisaged to jump every minute.

With reference to the embodiment presented in FIGS. 1 to 3, the rotary locking element 7 is a flirt in the form of a rod rotatably mounted in its centre. The flirt is integral with an axial locking pinion 8 in order to mesh with an intermediate wheel 9 of the finishing train. The locking rack 3 is rotatably mounted at a first end opposite the locking portion, which comprises the stop pallet-stone 3*a*. The rotary locking rack 3 includes at another end in a locking portion, an edge portion 3*b*, which may be a finger 3*b* arranged to follow the profile of the cam 6 integral with the accumulation seconds wheel AFSW 2. This tooth-shaped cam 6 controls the pivoting of the rack 3, which comprises the locking pallet-stone 3*a* disposed on a side opposite the finger 3*b*. As indicated above, this pallet-stone 3*a* may be made of a hard material reducing the frictions with the locking element 7 in contact with the pallet-stone 3*a* in a stop phase.

The pallet-stone 3*a* is arranged to cooperate in support with said locking element 7, which is a flirt, in order to lock said finishing train in a stop phase, or to release said locking element 7 and said finishing train in a jump phase. The flirt 7 comprises a first locking rod portion and a second locking rod portion in relation to its centre that comprises the axial locking pinion 8. Once the pallet-stone 3*a* is no longer in contact with the first rod portion of the flirt 7 or the second rod portion of the flirt 7, in the jump phase, the flirt 7 is set in rotation and rotates over 180° in order to make the finishing train rotate before a new locking position of the finishing train in a stop mode. In the jump mode, the cage 15 of the tourbillon is rotated 6° clockwise (CW) by the finishing train in order to add one second to the time. The accumulation seconds wheel 2 AFSW is driven with the cage 15, which is linked to the coaxial seconds wheel 5 of 6° of angle to rewind the spring 4 of the AFSW rack. The accumulation seconds wheel 2 AFSW is driven by the cage 15, because the escapement mechanism also rotates with the cage. The rewinding of the spring 4 performs rapidly, which means that the end of the flirt 7 comes directly back in contact with the stop pallet-stone 3*a* once the flirt 7 has rotated 180°. From this new locking, a new stop phase operation occurs.

It is understood that the 180° rotation of the flirt 7 before a new stop is directly and dynamically linked to the inertias of the moving components. In particular the inertia of the flirt 7, which has the fastest rotation, is of great importance. Therefore, it will be preferred a construction of the flirt 7 favouring a low inertia, such that it may be obtained with LIGA manufacturing means in nickel or phosphorus nickel or DRIE manufacturing means in silicon. These manufacturing means make it possible to produce a flirt 7 of precise and advantageous geometry for limiting the inertia of the flirt 7.

As shown preferably in FIG. 2, during the stop phase, the escape wheel set 11 is driven in a first direction of rotation (ACW) by the accumulation seconds wheel 2, which corresponds to each half oscillation of the oscillator 14 maintained. 5 small pitches referenced e1 to e5 of the escape wheel set 11 rotated by the accumulation seconds wheel 2 by means of the escape pinion 12 are also schematically represented. This unwinds said rack 3 spring 4 that pushes the accumulation seconds wheel 2 and moves said pallet-stone 3*a* in the direction of the release of the flirt 7.

As the finishing train is locked in the stop mode with the exception of the accumulation seconds wheel 2, the spring 4 of the rack 3 of the accumulation seconds wheel 2 releases energy to make said accumulation seconds wheel 2 rotate in order to drive the escape wheel set 11. In the jump mode, as soon as the flirt 7 is no longer in contact with the pallet-stone 3*a*, the finishing train by means of the axial locking pinion 8 of the flirt 7, is arranged to make pivot, by means of the seconds pinion 5 and of the tourbillon cage 15, said accumulation seconds wheel 2. This accumulation seconds wheel 2 with the tourbillon cage 15 rotate by 6° of angle in a second direction of rotation, which is clockwise (CW) opposite to said first direction of rotation imposed at the escape wheel set 11 by the seconds wheel 2, according to a travel corresponding to an angular jump of one second. The cage 15 of the tourbillon is pivoted by 6° of angle according to the reference L1 in the jump mode clockwise (CW) in a direction opposite to the pivoting of the accumulation seconds wheel 2 in the stop phase. At the end of the jump, the flirt 7 comes back to rest against the pallet-stone 3*a* in order to again lock the finishing train with the exception of the accumulation seconds wheel 2. The flirt 7 with its two rod portions of the same length performs a 180° rotation to change from the jump mode to the following stop mode.

It should be noted that the flirt 7 is linked to the finishing train and to the barrel by the intermediate wheel 9 in order to make it rotate about its central arbor at each jump mode of 1 second and to release the finishing train 5, 8, 9, 10, as well as the cage 15 of the tourbillon in this embodiment. The force of the drive spring or springs of the finishing train is greater than the force of the rack 3 spring 4. Thus, the finishing train immediately starts to function from its release which makes it possible to keep a good synchronism over time, also given that the escapement mechanism and the oscillator 14 are maintained in function during the stop phase even if the finishing train is locked except for the accumulation seconds wheel 2.

All of the elements of the force control mechanism described above are mounted on a plate, a medium bar, a flirt bar, which are not represented to avoid overloading the drawings.

As already mentioned above, the accumulation seconds wheel 2 includes a peripheral toothing meshing with the toothed escape pinion 12 coaxial to the escape wheel set 11. A medium wheel 10, that includes the finishing train, has a peripheral toothing meshing with the seconds axial toothed pinion 5 coaxial to the accumulation seconds wheel 2, and of which the arbor of the seconds pinion 5 is connected to the tourbillon cage 15. An intermediate wheel 9, that also includes said finishing train, includes an intermediate axial toothed pinion 19 meshing with the peripheral toothing of the medium wheel 10. The intermediate wheel 9 includes a peripheral toothing for meshing with said axial locking pinion 8 integral with the rotary locking element 7, which is the flirt. In the jump phase during the release of said finishing train, the intermediate axial toothed pinion 19 is arranged to allow the medium wheel 10 to rotate, to enable it to make the tourbillon cage 15 pivot by means of the seconds pinion 5 in said second direction of rotation CW. In this direction of rotation the seconds pinion 5 supplies the energy to be accumulated in the rack 3 spring 4 by making the accumulation seconds wheel 2 rotate CW.

In order to determine certain dimensional values depending on the elements described above it can be mentioned that the locking is carried out by a train from the medium 10 and a flirt 7 of large diameter. This makes it possible to limit the displacement during the second, to limit the frictions, and remove the pivoting of the flirt 7 from the surface occupied by the tourbillon cage on the plate.

The significant ratio between medium 0.116 rpm and the flirt 0.5 rps (30 rpm) requires an intermediate wheel set, which is the intermediate wheel 9. This gives for example a medium wheel 10 and intermediate wheel 9 ratio at Z=120/7 and m=0.07 mm, and an intermediate wheel 9 and flirt 7 ratio at Z=90/6 and m=0.07 mm.

According to an alternative version, it is possible to drive the flirt 7 from the tourbillon cage 15. This requires producing a tourbillon cage with an outer toothing engaged with the axial locking pinion 8, which is the flirt pinion. The ratio between the cage 15 and the flirt 7 is 1 rpm and flirt 0.5 rps (30 rpm), may be carried out with a direct train. The medium wheel 10 and intermediate wheel 9 ratio is Z=180/6 and m=0.079 mm with a position of the flirt identical to that of the preceding version. However, the aesthetics of the tourbillon cage is penalised by the outer toothing.

The locking (stop phase) on the pallet-stone 3*a* of the rack 3 is 0.08 mm, which is comfortable for an escapement pallet, but probably a little low with regards to the length of the rack. The construction may easily gain 25% by increasing the working radius of the pallet-stone 3*a*. If it is necessary to gain more, it is necessary to work on the tooth of the AFSW and change its ratio with the rack. In any case, the displacement increase (for safety) on the pallet-stone 3*a* increases the risks related to the frictions.

For the adjustment of the torque, the AFSW rack 3 spring 4 includes an eccentric part 34 as previously indicated, for the adjustment of its force at the end opposite the locking portion. There may be an adjustment of the amplitude of the constant force, or an adjustment of the quality of the jump depending on the torque variations supplied by the train.

It should be noted that it may be devised to produce the stop member 3, which may be the rack 3, and the spring 4 in one single part, defined as spring part. This spring part 3, 4 may comprise in a locking portion, an edge portion 3*b*, which may be a finger 3*b* to come into contact with the cam 6 or with the guide portion on the fixed seconds wheel 2, and a stop part 3*a* on one side opposite the edge portion in order to lock the locking element 7 in stop phase. This spring part may be easier to produce than the assembly consisting of the stop member 3 and of the spring 4 strictly speaking.

Figure 5:
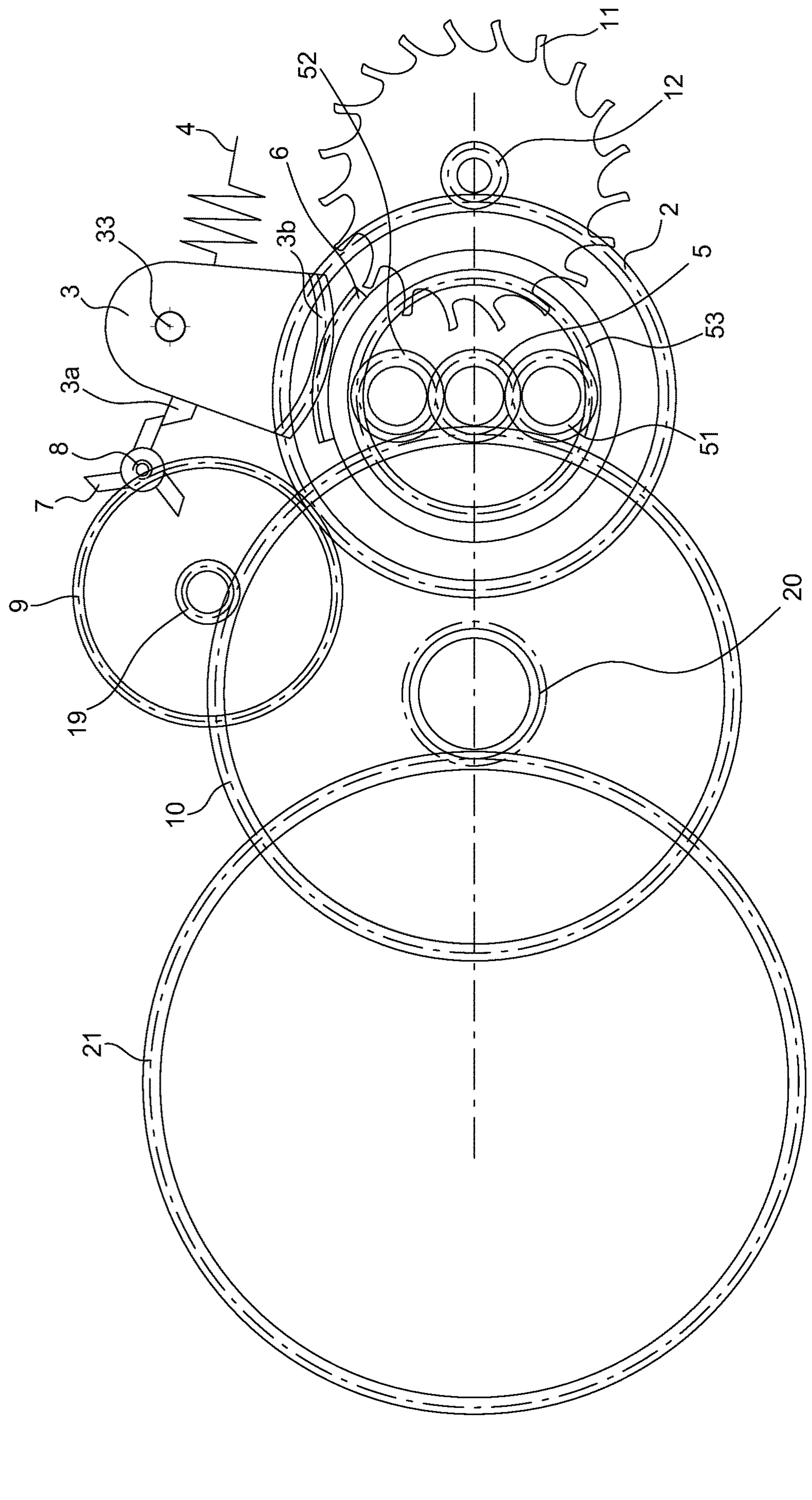
FIG. 5 represents a view from below of another schematic embodiment of a traditional watch mechanical movement with the finishing train without tourbillon and the force control mechanism according to the invention.

A version with a differential train makes it possible to produce the equivalent to this solution for a train not including a tourbillon as explained hereafter with reference to FIG. 5 of a traditional movement. At least one planetary wheel 51, 52 pivots on the seconds wheel 2, which is pivoted on its seconds pinion 5. The planetary wheels are engaged with a crown 53 in order to form a flat differential gear, but any type of differential may be suitable. Thus, the crown 53, as well as the planetary wheel or wheels 51, 52 pivoting about the seconds pinion 5, are not integral with the accumulation fixed seconds wheel 2. The crown 53 is driven by the stop member 3, which may be considered as an accumulation seconds rack 3 and by its spring 4. The rack 3 pivots about an arbor 33.

By way of reminder with reference for example to FIG. 3, in the stop phase, the finishing train is locked by pressing the flirt 7 on the pallet-stone 3*a* of the rack 3, and the escape wheel set 11 with its escape pinion 12 is driven by the seconds wheel 2, its rack 3 and the spring 4 of the rack. In the jump phase, the pallet-stone 3*a* of the rack 3 releases the finishing train. The seconds pinion 5 rotates 6° (one second) and rewinds the spring 4 of the rack 3 for the seconds wheel 2. The AFSW rack 3 locks the finishing train. The finger 3*b* of the rack 3 follows the movement of the tooth 6, which is the cam until the pallet-stone 3*a* is no longer in contact with the end of the flirt 7 in order to release the finishing train. Not all of the other elements already cited above, which are sufficiently clearly shown in the preceding figures, will be repeated.

Figure 4:
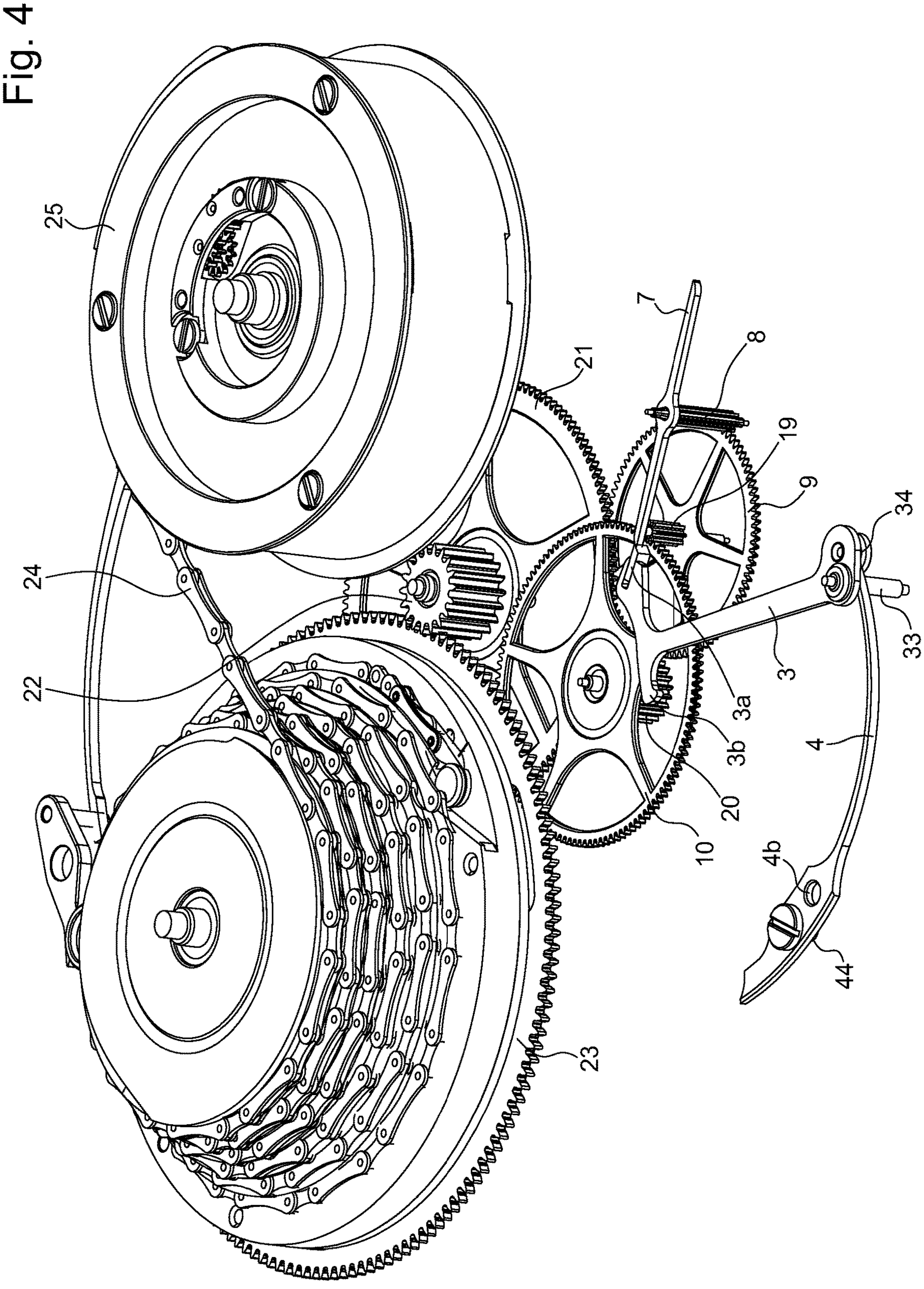
FIG. 4 represents a partial three-dimensional view from below of one embodiment of the watch movement with the finishing train, the barrel connected by chains to a fusee for driving the finishing train, but without representing the accumulation seconds wheel and the escapement with the oscillator.

FIG. 4 represents a partial three-dimensional view from below of one embodiment of the watch movement with the finishing train 9, 10 21, the barrel 25 connected by chains 24 to a fusee 23 for driving the finishing train, but without representing the accumulation seconds wheel and the escapement with the oscillator. The fusee 23 comprises a peripheral toothing for meshing with a coaxial pinion 22 of a medium large wheel 21, which rotates by a peripheral toothing a toothed pinion 20 in a coaxial position of the medium wheel 10, which may be driven by an intermediate axial toothed pinion 19 of the intermediate wheel 9, which itself is driven by the axial locking pinion 8 of the flirt 7.

FIG. 5 additionally represents another schematic embodiment of a traditional watch mechanical movement with the finishing train and the force control mechanism according to the invention. Some elements already described with reference to FIGS. 1 to 3 are in this embodiment of the traditional movement, which does not comprise a tourbillon. But there is an energy accumulation by a spring 4 connected to a stop member 3 rotatably mounted about an arbor 33 as already described above. In this scenario, the spring 4 rather tends to pull the stop member 3 in the stop phase of the movement.

In this embodiment, the 2 phases may again be specified, which are on the one hand the stop phase and on the other hand the jump phase. In the stop phase, the finishing train 5, 8, 9, 10 is locked by pressing a tooth of the locking element 7 against the pallet-stone 3*a* of the stop member 3. The escape wheel set 11 is driven by the accumulation fixed seconds wheel 2 anticlockwise (ACW) by the action of the spring 4 on the stop member 3. In the jump phase, the pallet-stone 3*a* of the stop member 3 is moved to release the finishing train. At the same moment, the seconds pinion 5 rotates 6° clockwise (CW) and driving the crown 53 by means of planetary wheels 51, 52 also clockwise, which also makes it possible to rewind the spring 4. As the pallet-stone 3*a* of the stop member 3 comes back in locking position, the stop member 3 again locks the finishing train for a new operation in stop phase in order to maintain the function of the escapement mechanism related to the oscillator.

Planetary wheels 51, 52 are also mounted in connection with the seconds pinion 5 coaxial to the seconds wheel 2. The stop member 3 may be an arched plate 3 pivoting about the arbor 33 and held or pulled by the spring 4 in this embodiment. An edge portion, which is produced in the form of a toothed circular portion 3*b*, may be in contact with a guide portion, which is a toothed cam portion 6 in the form of a circular arc on the crown 53. In a stop phase, the stop pallet-stone 3*a* of the stop member 3, is in contact with a tooth of a locking element 7, which comprises in a central portion an axial locking pinion 8 for driving the intermediate wheel 9 having a peripheral toothing. The locking element 7 may comprise a plurality of teeth around its rim to come into contact with the stop pallet-stone 3*a* in the stop phase. In the jump phase, the locking element 7 is released in order to rotate by an angle of 120° defining the seconds jump, as there are 3 locking teeth.

In the stop phase, the escape wheel set 11 is driven by the accumulation fixed seconds wheel 2 by means of its coaxial escape pinion 12 engaged with a peripheral toothing of the accumulation fixed seconds wheel 2. At the moment of the jump phase, this accumulated energy is supplied to the finishing train for the jump of the second. The medium wheel 10 driven by the intermediate pinion 19 of the intermediate wheel 9, has a peripheral toothing for meshing with the coaxial seconds pinion 5 for the jump of the second. With no direct influence on this jump phase, a medium large wheel 21 has a peripheral toothing for meshing with a medium coaxial pinion 20. Through the action of the seconds pinion 5, when the finishing train is in operation, the arrangement by the differential with the planetary wheels 51, 52 and the crown 53 make it possible to rewind the spring 4 of the AFSW to end up again in the stop mode with the pallet-stone 3*a* locking the locking element 7 by one of its teeth.

The wheel set or seconds wheel may be pivoted on a ball bearing supported by the plate.

Figure 6:
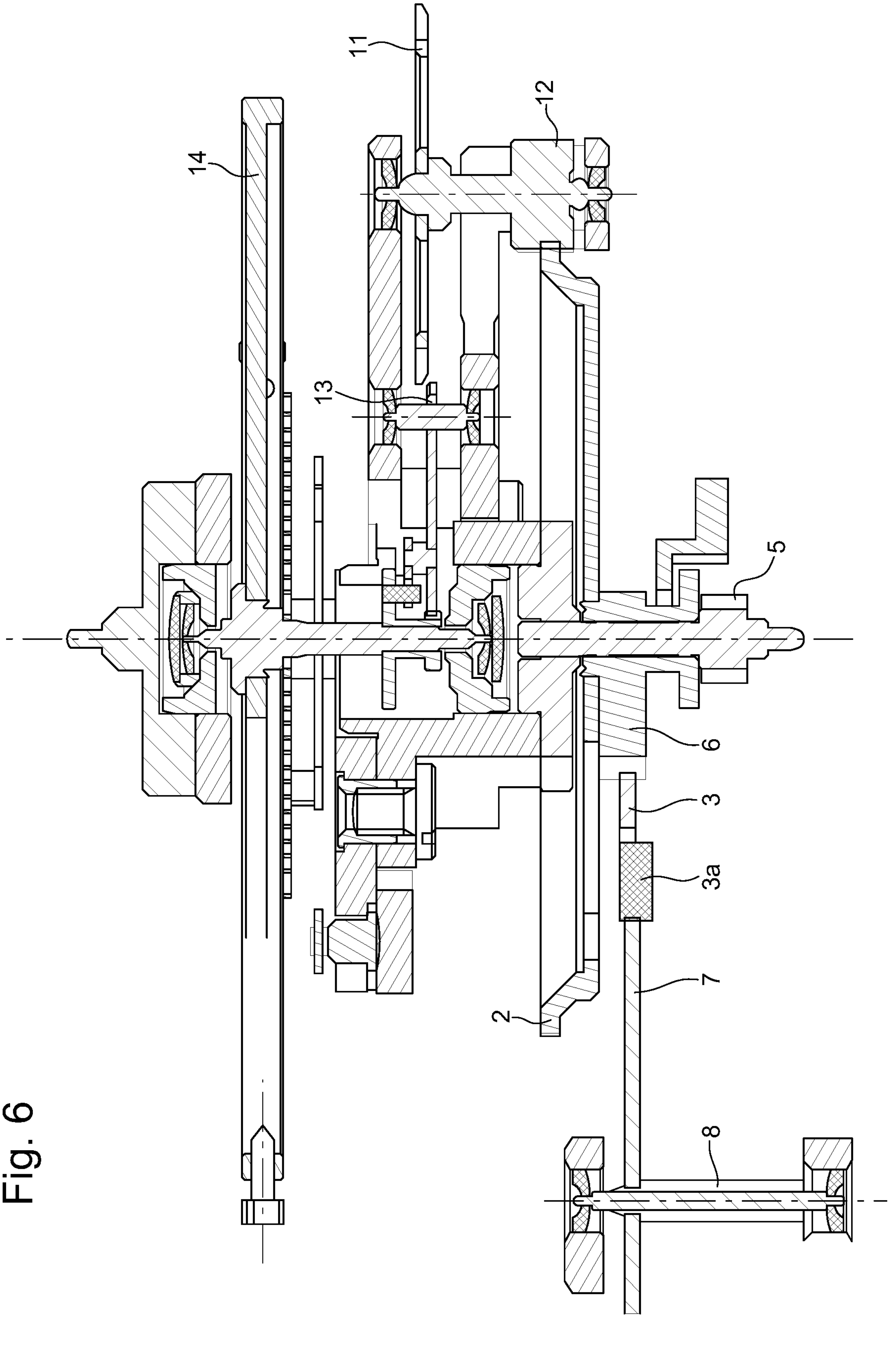
FIG. 6 represents a cross section from bottom to top of the mechanism at the centre of the tourbillon such as partially represented above in FIG. 1.

FIG. 6 shows a cross section from bottom to top of the mechanism at the centre of the tourbillon as partially represented above with reference to FIG. 1. It is especially noted in this figure that the seconds pinion 5 is the arbor of the cage 15 of the tourbillon with two pivoting noses. The cage 15 of the tourbillon encloses the escapement mechanism with the escape wheel set 11, the Swiss lever 13 and in connection with the oscillator 14 that is the sprung balance.

In FIG. 6, the accumulation fixed seconds wheel 2 meshes with the escape pinion 12, which means that when the tourbillon cage 15 rotates at each second, a rotation is also performed for the escapement mechanism related to the oscillator and is also the accumulation fixed seconds wheel 2.

The guide cam 6 is effectively integral with the accumulation fixed seconds wheel 2. The rack 3 comprises a portion in contact with the tooth-shaped cam 6 and on the other side a locking pallet-stone 3*a* for locking the flirt 7 in a stop mode. The flirt 7 also comprises an axial locking pinion 8, which may be set in rotation upon the release of the flirt 7 in the jump mode. All of the other elements have already been explained above and will not be repeated again.

From the description that has just been given, multiple alternative embodiments of the mechanical movement watch with force control mechanism and of the jumping seconds type may be designed by the person skilled in the art without departing from the scope of the invention defined by the claims. The mechanical movement may be a traditional mechanical movement with an accumulation seconds wheel also in connection in order to drive or maintain the escape wheel set with the oscillator in a stop phase.

The invention claimed is:

1. A mechanical movement watch with force control mechanism, and of the jumping seconds type, the force control mechanism being disposed in a finishing train of the mechanical movement, which is arranged between an energy source and an escape wheel set that includes an escapement mechanism linked to an oscillator intended to be set in oscillation in normal function by a driving force generated by said energy source in order to make said escape wheel set rotate always in a single direction of rotation at each half oscillation of the oscillator, said escape wheel set meshing with a seconds wheel, wherein said force control mechanism comprises a rotary locking element arranged to cooperate with a stop member mechanically linked to said seconds wheel in order to lock in a stop mode or release in a jump mode said finishing train according to the angular position of said seconds wheel, a stop member spring in order to rotate the seconds wheel and the escapement mechanism linked to the oscillator at each half oscillation of the oscillator in stop mode, and the finishing train making it possible for the rotary locking element and for a seconds pinion coaxial to said seconds wheel to rotate in order to perform a jump of one second in jump mode, and also making it possible to perform a rewinding of the stop member spring in connection with the seconds pinion, while making it possible to lock the rotary locking element and the finishing train for the stop mode following the jump mode.

2. The mechanical movement watch according to claim 1, wherein the spring once wound, is arranged to push the stop member against a cam or a guide portion in order to rotate the seconds wheel and make it possible to drive the escapement mechanism linked to the oscillator in a stop mode.

3. The mechanical movement watch according to claim 2, wherein the stop member is a rack rotatably mounted about an arbor at a first end and comprising at a locking portion at a second end, an edge portion arranged to, under the action of the rack spring, follow the profile of said cam or of the guide portion in order to rotate the seconds wheel, and a stop part, such as a pallet-stone, disposed on one side opposite the edge portion and arranged to lock the rotary locking element in a stop mode.

4. The mechanical movement watch according to claim 1, wherein the rotary locking element is a flirt, which is produced according to a LIGA or DRIE method.

5. The mechanical movement watch according to claim 3, wherein the spring is mounted on a plate by a fastening rod passing through either a first hole, or a second hole of an end plate of the spring according to the desired position of the spring, wherein a metal spring is composed from the fastening plate of a spring blade, where a free end of the spring blade is fastened to an eccentric part disposed next to the arbor of the first end of the rack, in such a way as to push the rack in the direction of the cam, in order to make it possible to adjust the force of the spring.

6. The mechanical movement watch according to claim 3, wherein the edge portion of the rack is a finger bearing against the tooth-shaped cam.

7. The mechanical movement watch according to claim 1, wherein the stop member and the spring only form one single part, defined as spring part.

8. The mechanical movement watch according to claim 1, for which the watch is a tourbillon watch, of which the arbor of a cage of the tourbillon enclosing the escapement mechanism linked to the oscillator, is the seconds pinion, wherein in a stop mode with locking of the finishing train, the seconds wheel is arranged in order to drive by small pitches in a first direction of rotation, the escape wheel set at each half oscillation of the oscillator by the action of the spring against a cam integral with the seconds wheel, and that in a jump mode upon the release of the finishing train, the seconds pinion is driven by a wheel of the finishing train in order to perform an angular jump of one second corresponding to the number of small pitches performed to drive the seconds wheel in the stop mode, in a second direction of rotation opposite the first direction of rotation, the cage of the tourbillon, the escapement mechanism with the oscillator and the seconds wheel linked to the escapement mechanism being moved in rotation by an angle of 6° corresponding to one second in the jump mode, and a rewinding of the spring is performed to start a successive stop mode with the locking of the finishing train.

9. The mechanical movement watch according to claim 8, wherein the first direction of rotation is an anti-clockwise rotation, whereas the second direction of rotation is a clockwise rotation.

10. The mechanical movement watch according to claim 3, wherein the locking element is a flirt, which comprises a first locking rod portion and a second locking rod portion in relation to its centre which comprises the axial locking portion in such a way as to perform a half revolution in the jump mode before being locked by the pallet-stone of the rack in the stop mode.

11. The mechanical movement watch according to claim 1, wherein the seconds wheel includes a peripheral toothing meshing with a toothed escape pinion coaxial to said escape wheel set, a medium wheel of the finishing train having a peripheral toothing meshing with the seconds axial toothed pinion coaxial to said seconds wheel, an intermediate wheel that also includes said finishing train including an intermediate axial toothed pinion meshing with a peripheral toothing of the medium wheel, said intermediate wheel including a peripheral toothing in order to mesh with said axial locking pinion integral with said rotary locking element.

12. The mechanical movement watch according to claim 1, wherein the escapement mechanism is a Swiss lever escapement mechanism of the mechanical movement, and wherein said oscillator is a sprung balance intended to be set in oscillation by a driving generated by a barrel spring constituting said energy source in normal function mode.

13. The mechanical movement watch according to claim 3, wherein the pallet-stone of the rack is made of a hard material, such as ruby, in order to reduce the frictions.

14. The mechanical movement watch according to claim 1, for which the watch comprises a traditional mechanical movement without tourbillon, wherein the seconds wheel pivots on the seconds pinion, which is connected by one or two rotary planetary wheels to a crown forming a differential gear not integral with the seconds wheel, wherein the crown supports a toothed cam portion in the shape of a circular arc as guide portion, wherein the stop member is rotatably mounted about the arbor and comprises an edge portion, which is produced in the shape of a toothed circular portion, which meshes with the toothed cam portion, wherein in a stop mode with locking of the finishing train, the seconds wheel is arranged in order to drive by small pitches in a first direction of rotation, the escape wheel set at each half oscillation of the oscillator by the action of the spring, which pulls the stop member up to a release position of the finishing train for the jump mode, wherein in a jump mode upon the release of the finishing train, the seconds pinion is driven by a wheel of the finishing train in order to perform an angular jump of one second corresponding to the number of small pitches performed to drive the seconds wheel in the stop mode, and wherein the crown is driven by the seconds pinion clockwise in order to rewind the spring and lock the finishing train for a successive stop mode.

* * * * *